United States Patent
Sundararajan

(10) Patent No.: US 7,173,900 B1
(45) Date of Patent: Feb. 6, 2007

(54) METHOD AND APPARATUS FOR CHIP GENERATION OF A CHIP SEQUENCE

(75) Inventor: Ganesh Sundararajan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1128 days.

(21) Appl. No.: 10/179,267

(22) Filed: Jun. 26, 2002

(51) Int. Cl.
*H04J 13/02* (2006.01)
*H04K 1/00* (2006.01)

(52) U.S. Cl. ........................ 370/209; 375/140

(58) Field of Classification Search ................ 370/203, 370/208, 209; 375/140, 367
See application file for complete search history.

(56) References Cited

U.S. PATENT DOCUMENTS

| | | | | |
|---|---|---|---|---|
| 6,005,888 A | * | 12/1999 | Barron | 375/140 |
| 6,389,138 B1 | * | 5/2002 | Li et al. | 380/35 |
| 6,553,527 B1 | * | 4/2003 | Shephard, III | 714/733 |
| 6,643,280 B1 | * | 11/2003 | Li et al. | 370/342 |
| 6,650,687 B1 | * | 11/2003 | McDonough | 375/140 |
| 6,766,337 B1 | * | 7/2004 | Bae et al. | 708/250 |
| 7,053,800 B2 | * | 5/2006 | Fisher-Jeffes | 341/50 |
| 2003/0103447 A1 | * | 6/2003 | Thorson et al. | 370/209 |

OTHER PUBLICATIONS

Technical Specification Group C of the Third Generation Partnership Project 2 (3GPP2); TIA/EIA/IS-2000.2-A, Apr. 10, 2000.

* cited by examiner

*Primary Examiner*—Min Jung

(57) ABSTRACT

A method and an apparatus for generating a chip of a chip sequence based on a supplied chip position index and a supplied sequence index is provided by generating a basic sequence bit using a portion of the chip position index and the sequence index, and by generating different mask bits using different portions of the chip position index and the sequence index, the mask bits being used in conjunction with the basic sequence bit to generate the chip. Such a chip generation process increases the chip generation rate so that users requesting chips to be generated may be efficiently pipelined.

21 Claims, 3 Drawing Sheets

METHOD AND APPARATUS FOR CHIP GENERATION OF A CHIP SEQUENCE

FIELD OF THE INVENTION

The invention relates to telecommunications chip sequences and more particularly to the generation of chips of a telecommunications chip sequence.

BACKGROUND OF THE INVENTION

Chip sequences used in telecommunications applications requiring a set of N symbols or chip sequences, typically being binary K-tuples, which could be used for example as spreading codes or modulation codes, are often required for use in combination with data streams to generate for example spread spectrum or modulated data streams. This is particularly true for a wireless system such as CDMA (Code Division Multiple Access) or UMTS (Universal Mobile Telecommunications System) in which chip sequences form the basis. Similarly, a system will also generally require the set of chip sequences for the inverse operation of extracting from, for example, the spread spectrum or modulated data streams, the original data stream. The specific characteristics of any set of chip sequences are determined by the use to which the set is put, which may include, but is not limited to, such properties as orthogonality, normality, and completeness. The particular desired characteristics often determine the class or type of chip sequence required. Some common examples of chip sequences are Walsh sequences, Gold codes, and orthogonal Gold codes. The use of a particular type of chip sequence in a telecommunications system often employs either an algorithm to generate the chip sequences or a memory store from which the chip sequences may be retrieved as they are required and used in the system. To maintain all of the desired properties of each chip sequence and the set of chip sequences as a whole, it is important that the algorithm or memory store reliably reproduce the desired chip sequence or chip of the chip sequence when required.

It is noted that in some applications, the number and size of the sequences can be substantial. For example 512 sequences each of length 512 may be required.

The simplest of conventional methods of chip sequence generation apply either a brute force calculation to generate the entire chip sequence from the known algorithm or a robust storage approach which stores in memory all of the chip sequences of the set of chip sequences that will be required in the application. The brute force calculation can be quite time consuming and processor intensive, whereas the storage in memory of all the chip sequences can be memory intensive. To implement either approach cost effectively in hardware would require a relatively large number of components on an integrated circuit. The current requirements in the use of processing speed and memory limits the rate of chip generation and hence limits the number of potential users who require a chip to be generated at a certain rate.

It would be desirable if there was a method or an apparatus for chip sequence generation that did not suffer the problems of these conventional approaches, and moreover increased the efficiency of chip generation for higher rate chip generation.

SUMMARY OF THE INVENTION

Embodiments of the present invention provide a method and an apparatus for generating a chip of a chip sequence based on a supplied chip position index and a supplied sequence index by generating a basic sequence bit using a portion of the chip position index and the sequence index, and by generating different mask bits using different portions of the chip position index and the sequence index, the mask bits being used in conjunction with the basic sequence bit to generate the chip. Such a chip generation process increases the chip generation rate so that users requesting chips to be generated may be efficiently pipelined.

According to a first broad aspect, the invention provides for an apparatus for generating a chip of a chip sequence, the chip identified by a sequence index and a chip position index, the apparatus including a basic sequence bit generator for generating a basic sequence bit using a basic sequence portion of the sequence index and a basic sequence portion of the chip position index, a supermask bit generator for generating a supermask bit using a supermask portion of the sequence index and a supermask portion of the chip position index, a submask bit generator for generating a submask bit using a submask portion of the sequence index, a submask portion of the chip position index, and the supermask bit, and a masking logic operator for masking the basic sequence bit with the submask bit generating the chip of the chip sequence.

In some embodiments of the invention the chip sequence is a Walsh chip sequence.

In some embodiments of the invention, the supermask bit generator includes a supermask matrix storage means for storing supermask bits indexed by the supermask portion of the sequence index and the supermask portion of the chip position index, the submask bit generator includes a submask matrix storage means for storing submask bits indexed by the submask portion of the sequence index and the submask portion of the chip position index, and the basic sequence bit generator comprises a basic sequence matrix storage means for storing basic sequence bits indexed by the basic sequence portion of the sequence index and the basic sequence portion of the chip position index.

In some embodiments of the invention, the submask bit generator includes a pre-submask sequence generator for generating a pre-submask sequence using the submask portion of the sequence index, an inverse pre-submask sequence generator for generating an inverse pre-submask sequence using the submask portion of the sequence index, a submask sequence selector for generating a submask sequence in which the submask sequence is generated from one of the pre-submask sequence and the inverse pre-submask sequence as a function of the supermask bit, and a submask sequence bit selector for generating the submask bit using the submask sequence, and the submask portion of the chip position index.

In some embodiments of the invention, the submask bit generator includes a pre-submask bit generator for generating a pre-submask bit using the submask portion of the sequence index and the submask portion of the chip position index, and a pre-submask bit masking logic operator for masking the pre-submask bit with the supermask bit to generate the submask bit.

In some embodiments of the invention, the basic sequence bit generator includes a basic sequence generator for generating a basic sequence using the basic sequence portion of the sequence index, and a basic sequence bit selector for generating the basic sequence bit using the basic sequence, and the basic sequence portion of the chip position index.

In some embodiments of the invention, the basic sequence bit selector, and the submask sequence bit selector are addressable selectors.

In some embodiments of the invention, the supermask matrix storage means, the submask matrix storage means, and the basic sequence matrix storage means each include a memory store.

In some embodiments of the invention, the chip sequence is a 512 Walsh chip sequence, the sequence index is a 9-bit Walsh sequence index, the chip position index is a 9-bit Walsh chip position index, the supermask matrix is a binary representation of a $512^{th}$ order Hadamard matrix expressed in terms of $64^{th}$ order Hadamard matrices, the supermask portion of the sequence index being bits 6 through 8 of the 9-bit Walsh sequence index, the supermask portion of the chip position index being bits 6 through 8 of the 9-bit Walsh chip position index, the submask matrix is a binary representation of a $64^{th}$ order Hadamard matrix expressed in terms of $4^{th}$ order Hadamard matrices, the submask portion of the sequence index being bits 2 through 5 of the 9-bit Walsh sequence index, the submask portion of the chip position index being bits 2 through 5 of the 9-bit Walsh chip position index, and the basic sequence matrix is a $4^{th}$ order binary Hadamard matrix, the basic sequence portion of the sequence index being bits 0 and 1 of the 9-bit Walsh sequence index, the basic sequence portion of the chip position index being bits 0 and 1 of the 9-bit Walsh chip position index.

According to a second broad aspect, the invention provides for an apparatus for generating a chip of a chip sequence, the chip identified by a sequence index and a chip position index, the apparatus including a basic sequence bit generator for generating a basic sequence bit using a basic sequence portion of the sequence index and a basic sequence portion of the chip position index, a supermask bit generator for generating a super mask bit using a supermask portion of the sequence index and a supermask portion of the chip position index a series of M ordered m-level mask bit generators for generating a submask bit including a 1-level mask bit generator for generating an 1-level mask bit using a 1-level mask portion of the sequence index, a 1-level portion of the chip position index, and the super mask bit, and M−1 m-level mask bit generators for respectively generating an m-level mask bit using an m-level mask portion of the sequence index, an m-level portion of the chip position index, and an (m−1)-level mask bit, and a masking logic operator for masking the basic sequence bit with the submask bit generating the chip of the chip sequence.

According to a third broad aspect, the invention provides for an apparatus for sequentially generating for each user of a plurality of users a respective user chip of a respective assigned user chip sequence at a required chip rate, each user chip identified by a user sequence index and a chip position index, the transmitter including a hardware implemented chip generating circuit having a clock rate, for a given chip position index at the required chip rate the transmitter being adapted to input to the chip generating circuit the chip position index and a user sequence index for a different user of the plurality of users during a respective clock cycle, the chip generating circuit including a basic sequence bit generator for generating a basic sequence bit every clock cycle using a basic sequence portion of the user sequence index and a basic sequence portion of the chip position index, a supermask bit generator for generating a supermask bit every clock cycle using a supermask portion of the user sequence index and a supermask portion of the chip position index, a submask bit generator for generating a submask bit every clock cycle using a submask portion of the user sequence index, a submask portion of the chip position index, and the supermask bit, and a masking logic operator for masking the basic sequence bit with the submask bit generating the user chip of the user chip sequence of a different user every clock cycle, wherein the clock rate is at least N times the required chip rate, and user chips are generated for each user of N users at the required chip rate.

In some embodiments of the invention, the transmitter is further adapted to maintain a list of N users, associate each respective assigned user chip sequence with each user, and sequentially provide to the chip generating circuit a user sequence index for a different user of the N users every clock cycle.

According to a fourth broad aspect, the invention provides for an apparatus for generating a chip of a chip sequence, the chip identified by a sequence index and a chip position index, the apparatus including a basic sequence bit generating means for generating a basic sequence bit using a basic sequence portion of the sequence index and a basic sequence portion of the chip position index, a supermask bit generating means for generating a supermask bit using a supermask portion of the sequence index and a supermask portion of the chip position index, a submask bit generating means for generating a submask bit using a submask portion of the sequence index, a submask portion of the chip position index, and the supermask bit, and a masking logic operating means for masking the basic sequence bit with the submask bit generating the chip of the chip sequence.

According to a fifth broad aspect, the invention provides for a method for generating a chip of a chip sequence, the chip identified by a sequence index and a chip position index, the method including, generating a basic sequence bit using a basic sequence portion of the sequence index and a basic sequence portion of the chip position index, generating a supermask bit using a supermask portion of the sequence index and a supermask portion of the chip position index, generating a submask bit using a submask portion of the sequence index, a submask portion of the chip position index, and the supermask bit, and masking the basic sequence bit with the submask bit generating the chip of the chip sequence.

In some embodiments of the invention, generating the supermask bit includes retrieving the supermask bit indexed by the supermask portion of the sequence index and the supermask portion of the chip position index from a supermask matrix storage means, generating the submask bit includes retrieving the submask bit indexed by the submask portion of the sequence index and the submask portion of the chip position index from a submask matrix storage means, and generating the basic sequence bit includes retrieving the basic sequence bit indexed by the basic sequence portion of the sequence index and the basic sequence portion of the chip position index, from a basic sequence matrix storage means.

In some embodiments of the invention, generating the submask bit includes generating a pre-submask sequence using the submask portion of the sequence index, generating an inverse pre-submask sequence using the submask portion of the sequence index, generating a submask sequence in which the submask sequence is generated from one of the pre-submask sequence and the inverse pre-submask sequence as a function of the supermask bit, and generating the submask bit using the submask sequence, and the submask portion of the chip position index.

In some embodiments of the invention, generating the basic sequence bit includes generating a basic sequence using the basic sequence portion of the sequence index, and generating the basic sequence bit using the basic sequence, and the basic sequence portion of the chip position index.

According to a sixth broad aspect, the invention provides for a method for generating a chip of a chip sequence, the chip identified by a sequence index and a chip position index, the method including generating a basic sequence bit using a basic sequence portion of the sequence index and a basic sequence portion of the chip position index, generating a super mask bit using a supermask portion of the sequence index and a supermask portion of the chip position index, generating a submask bit from generating a series of M ordered m-level mask bits including generating a 1-level mask bit using a 1-level mask portion of the sequence index, a 1-level portion of the chip position index, and the super mask bit generating M−1 m-level mask bits respectively using an m-level mask portion of the sequence index, an m-level portion of the chip position index, and an (m−1)-level mask bit, and masking the basic sequence bit with the submask bit generating the chip of the chip sequence.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
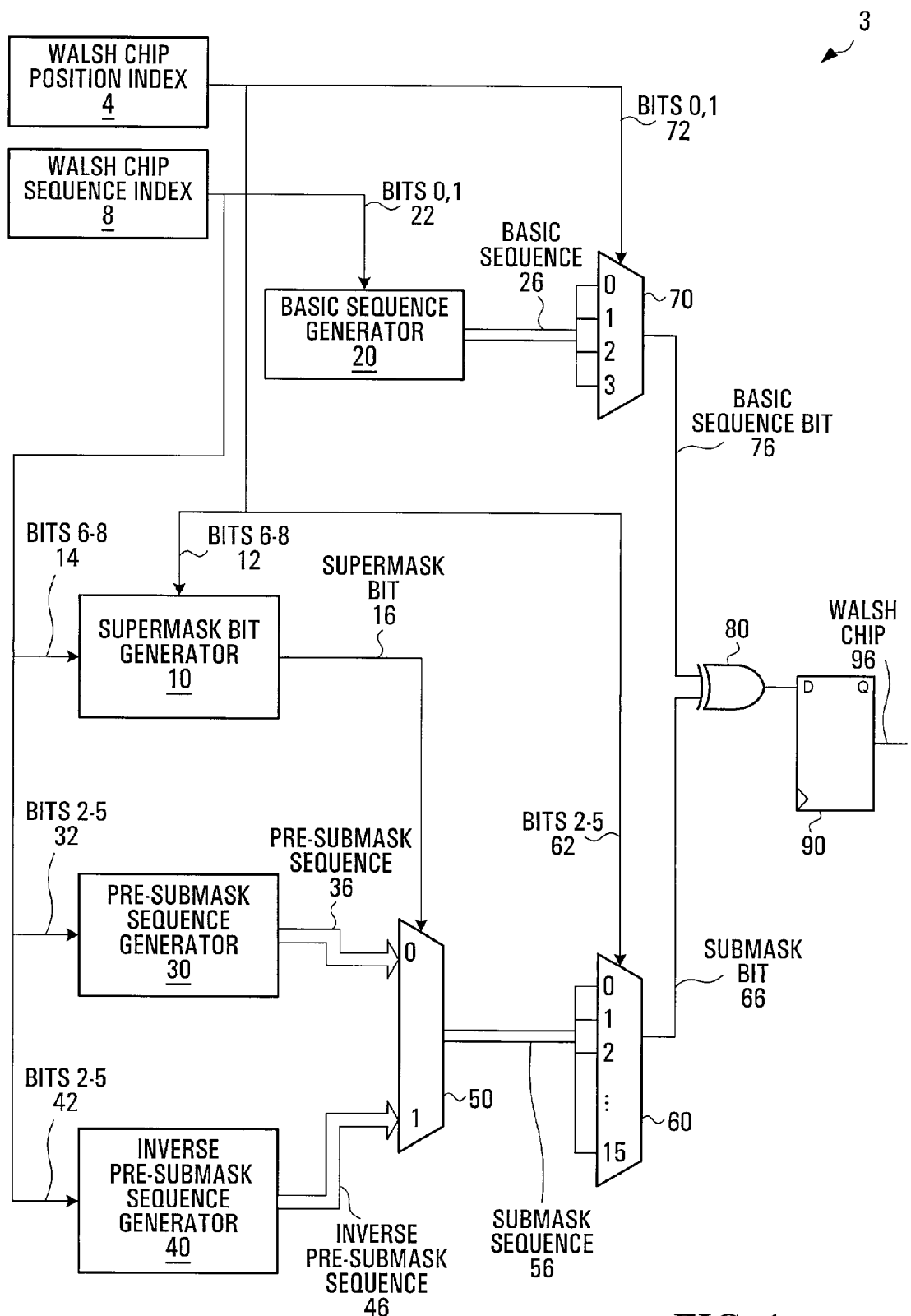
FIG. 1 is a block diagram of a Walsh chip generator constructed according to a preferred embodiment of the invention.

For the purposes of illustrating the preferred embodiment of the invention an example implementation of a chip generating apparatus which generates a Walsh chip from a 512-bit Walsh sequence being one of a set of 512 Walsh sequences is described. It is to be understood that the invention is not confined only to the generation of Walsh chips of Walsh sequences which are 512 chips in length or of a set which has 512 Walsh sequences, but contemplates any length Walsh sequence in a correspondingly numbered set, and moreover is to be understood as applying not only to Walsh sequences but more generally to any set of chip sequences with which the general method and apparatus are compatible. For example, Gold sequences, although not used in CDMA can also be generated according to an embodiment of the invention. Although as of today there is no requirement in CDMA systems for the generation of Walsh chip sequences of length greater than 512, the invention contemplates Walsh chip sequences of length greater than 512.

A complete set of Walsh chip sequences make up an orthogonal set, and the length of each Walsh sequence of the set equals the number of Walsh sequences in the set. A set of $N=2^K$ Walsh sequences (where K is a whole number) of length $N=2^K$ may be represented in a binary table or square matrix (referred to hereinafter as a Walsh bit sequence matrix) whose N rows are populated with Walsh bit sequences of N bit-length. A Walsh bit sequence is a binary representation of a Walsh chip sequence. A standard Walsh chip of a Walsh chip sequence which may for example take on a value of 1 or −1 may be represented by a Walsh bit in a Walsh bit sequence which respectively takes on a value of 0 or 1. The particular convention for the actual values of the Walsh chips and the particular correspondence of the binary representation are not of any specific significance as long as the conventions for the values and representation are consistent, and the convention for the Walsh chip to be used is operable for the use of the Walsh chip.

The specific example set of Walsh sequences for the purpose of illustrating the preferred embodiment, is the set of 512 Walsh sequences which are each 512 chips in length. A Walsh chip represented in the 512×512 Walsh bit sequence matrix is indexed by row number (by for example a 9-bit Walsh sequence index) which corresponds to the Walsh sequence number, and by column number (by for example a 9-bit Walsh chip position index) which corresponds to the chip position within the Walsh sequence. Walsh chips, therefor, may be identified, and for the purposes of the preferred embodiment described below, requested by Walsh sequence index and Walsh chip position index each of which is a 9-bit index, the bits of which are referred to herein as bits 0 through 8, where bit 0 is the least significant bit and bit 8 is the most significant bit. It should be noted that in the discussion for the preferred embodiment, indices of matrix entries are numbered beginning with 0 according to standard mathematical practices, namely the first row being at the top of the matrix, and the first column being at the left of the matrix. The Walsh bit-sequence matrix may be generated using well known Hadamard matrices which are of the form:

$$H_{2M} = \begin{bmatrix} H_M & H_M \\ H_M & \overline{H}_M \end{bmatrix}$$

where $H_M$ is the Hadamard matrix of order M, where M is a power of 2, and where $\overline{H}_M$ is the bit-wise compliment of $H_M$. The Hadamard matrix of order 2 is:

$$H_2 = \begin{bmatrix} 0 & 0 \\ 0 & 1 \end{bmatrix}$$

Recursively applying the relation between the Hadamard matrix of order 2M to the Hadamard matrix of order M, a total of K times (counting the application of the rule defining $H_2$ as applying the relation once) will produce a Hadamard matrix of order $2^K$ which will have as its rows $N=2^K$ Walsh bit sequences of bit-length $N=2^K$.

In the case of 512 bit-length sequences, the Walsh bit sequence matrix is $H_{512}$ (the Hadamard matrix of order 512) which is of the following form:

$$H_{512} = \begin{bmatrix} H_{256} & H_{256} \\ H_{256} & \overline{H}_{256} \end{bmatrix} = \begin{bmatrix} H_{128} & H_{128} & H_{128} & H_{128} \\ H_{128} & \overline{H}_{128} & H_{128} & \overline{H}_{128} \\ H_{128} & H_{128} & \overline{H}_{128} & \overline{H}_{128} \\ H_{128} & \overline{H}_{128} & \overline{H}_{128} & H_{128} \end{bmatrix} =$$

$$\begin{bmatrix} H_{64} & H_{64} & H_{64} & H_{64} & H_{64} & H_{64} & H_{64} & H_{64} \\ H_{64} & \overline{H}_{64} & H_{64} & \overline{H}_{64} & H_{64} & \overline{H}_{64} & H_{64} & \overline{H}_{64} \\ H_{64} & H_{64} & \overline{H}_{64} & \overline{H}_{64} & H_{64} & H_{64} & \overline{H}_{64} & \overline{H}_{64} \\ H_{64} & \overline{H}_{64} & \overline{H}_{64} & H_{64} & H_{64} & \overline{H}_{64} & \overline{H}_{64} & H_{64} \\ H_{64} & H_{64} & H_{64} & H_{64} & \overline{H}_{64} & \overline{H}_{64} & \overline{H}_{64} & \overline{H}_{64} \\ H_{64} & \overline{H}_{64} & H_{64} & \overline{H}_{64} & \overline{H}_{64} & H_{64} & \overline{H}_{64} & H_{64} \\ H_{64} & H_{64} & \overline{H}_{64} & \overline{H}_{64} & \overline{H}_{64} & \overline{H}_{64} & H_{64} & H_{64} \\ H_{64} & \overline{H}_{64} & \overline{H}_{64} & H_{64} & \overline{H}_{64} & H_{64} & H_{64} & \overline{H}_{64} \end{bmatrix}$$

As shown above the 512×512 Walsh bit sequence matrix can be created from the 64×64 Hadamard matrices. As can be seen, the 512×512 Walsh bit sequence matrix is made up of submatrices which are Hadamard matrices $H_{64}$ or their bit-wise compliment $\overline{H}_{64}$. According to the present invention, this information forms an 8×8 matrix called a supermask matrix (SM) which corresponds to a block representation of the 512×512 matrix, where the presence of 0 indicates $H_{64}$ and a presence of 1 indicates $\overline{H}_{64}$. The supermask matrix is of the following form:

$$SM = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix}$$

Since each element of SM corresponds to a $64^{th}$ order Hadamard matrix $H_{64}$ or its compliment, each row in the supermask matrix represents 64 Walsh sequences and each column represents a section of 64 Walsh chips from all 512 Walsh sequences. Each row of the supermask matrix SM therefore may be indexed by the three most significant bits (bits 8, 7 and 6) of the 9-bit binary Walsh sequence index to any of the Walsh sequences within the row, and each column of the supermask matrix SM may be indexed by the upper three bits (bits 8, 7 and 6) of the 9-bit binary Walsh chip position index to any of the Walsh chips positioned within the column.

The 64th order Hadamard matrix $H_{64}$ is made up of submatrices which are either the fourth order Hadamard matrix $H_4$ (referred to in this context as the basic sequence matrix) or its bit-wise compliment $\overline{H}_4$. According to this example of the present invention, this information forms a 16×16 matrix called a submask matrix (M) which forms a representation of the 64×64 matrix, where the presence of 0 indicates $H_4$ and a presence of 1 indicates $\overline{H}_4$. It should be noted that since M represents $H_{64}$, a 0 in the supermask matrix SM indicates a submask matrix M, and a 1 indicates a binary compliment of the submask matrix M. M is of the following form:

$$M = \begin{bmatrix} 0 & 0 & 0 & 0 & 0 & 0 & 0 & 0 & 0 & 0 & 0 & 0 & 0 & 0 & 0 & 0 \\ 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 \\ 0 & 1 & 1 & 0 & 0 & 1 & 1 & 0 & 0 & 1 & 1 & 0 & 0 & 1 & 1 & 0 \\ 0 & 0 & 0 & 0 & 1 & 1 & 1 & 1 & 0 & 0 & 0 & 0 & 1 & 1 & 1 & 1 \\ 0 & 1 & 0 & 1 & 1 & 0 & 1 & 0 & 0 & 1 & 0 & 1 & 1 & 0 & 1 & 0 \\ 0 & 0 & 1 & 1 & 1 & 1 & 0 & 0 & 0 & 0 & 1 & 1 & 1 & 1 & 0 & 0 \\ 0 & 1 & 1 & 0 & 1 & 0 & 0 & 1 & 0 & 1 & 1 & 0 & 1 & 0 & 0 & 1 \\ 0 & 0 & 0 & 0 & 0 & 0 & 0 & 0 & 1 & 1 & 1 & 1 & 1 & 1 & 1 & 1 \\ 0 & 1 & 0 & 1 & 0 & 1 & 0 & 1 & 1 & 0 & 1 & 0 & 1 & 0 & 1 & 0 \\ 0 & 0 & 1 & 1 & 0 & 0 & 1 & 1 & 1 & 1 & 0 & 0 & 1 & 1 & 0 & 0 \\ 0 & 1 & 1 & 0 & 0 & 1 & 1 & 0 & 1 & 0 & 0 & 1 & 1 & 0 & 0 & 1 \\ 0 & 0 & 0 & 0 & 1 & 1 & 1 & 1 & 1 & 1 & 1 & 1 & 0 & 0 & 0 & 0 \\ 0 & 1 & 0 & 1 & 1 & 0 & 1 & 0 & 1 & 0 & 1 & 0 & 0 & 1 & 0 & 1 \\ 0 & 0 & 1 & 1 & 1 & 1 & 0 & 0 & 1 & 1 & 0 & 0 & 0 & 0 & 1 & 1 \\ 0 & 1 & 1 & 0 & 1 & 0 & 0 & 1 & 1 & 0 & 0 & 1 & 0 & 1 & 1 & 0 \end{bmatrix}$$

The basic sequence matrix (which corresponds to the fourth order Hadamard matrix) is the following:

$$H_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix}$$

Since each element of M corresponds to a $4^{th}$ order Hadamard matrix $H_4$ or its compliment, each row in the submask matrix M represents four Walsh sequences and each column represents a section of four Walsh chips from all Walsh sequences. Each row of the submask matrix M therefore may be indexed by bits 5 through 2 of the 9-bit binary Walsh sequence index to any of the Walsh sequences therein, and each column of the submask matrix M may be indexed by bits 5 through 2 of the 9-bit binary Walsh chip position index to any of the Walsh chips therein. Finally, the lower 2 bits, namely bit 1 and bit 0, of the 9-bit binary Walsh sequence index, and the lower 2 bits, namely bit 1 and bit 0, of the 9-bit binary Walsh chip position index determines respectively an index to a column and a row of an $H_4$ or an $\overline{H}_4$ matrix (the basic sequence matrix or its bit-wise compliment) which determines which bit corresponds to the requested Walsh chip.

Referring to FIG. 1, a Walsh chip generator, generally indicated by 3, constructed according to a preferred embodiment of the invention will now be described. The Walsh chip generator 3 of the preferred embodiment illustrated in FIG. 1 generates one of 512 chips of one of 512 Walsh sequences from an input made up of a Walsh chip position index 4 and a Walsh sequence index 8. The Walsh chip position index 4 specifies which one of the 512 Walsh chips of a Walsh sequence is desired, and the Walsh sequence index 8 specifies which one of the 512 Walsh sequences is desired. Each of these indices is 9 bits in length which bits are numbered 0 to 8 as described above. Different portions made up of specific segments of bits of the indices are provided to various components of the Walsh chip generator 3 for use in generating the various bits the components are responsible to generate as detailed below. It should be noted that references made to ranges of bits specifying said portions of indices used are not indicative of the ordering of the bits defining the binary index. For example, in FIG. 1, "bits 6–8" 14 identify bits used as an index but does not dictate the order of the bits in significance. As described above, in the preferred embodiment, bit 0 is the least significant bit and bit 8 is the most significant bit.

A supermask bit generator 10 is input with bits 6–8 14 of the Walsh sequence index 8, and with bits 6–8 12 of the Walsh chip position index 4. The supermask bit generator 10 uses these portions of the indices to generate and output a super mask bit 16. The supermask bit 16 corresponds to the bit of the supermask matrix SM at the row indexed by bits 6–8 14 of the Walsh sequence index 8 and at the column indexed by bits 6–8 12 of the Walsh chip position index 4. The supermask bit generator 10 in the preferred embodiment is implemented by storage of the supermask matrix SM and the retrieval of bits therefrom using the supplied portions of indices as indices into the supermask matrix SM. Although this may be implemented by using a memory store, the preferred embodiment uses high/low $V_{cc}$ to store the matrix SM. Since 0 or 1 of the matrix represents either a logic low or high respectively, there is no need to have a memory store at the gate-level. Logic-level 0 can be obtained by connecting the input to ground, while logic-level 1 can be obtained by connecting the input to supply. In this manner, the preferred embodiment uses high/low $V_{cc}$ to store the various matrices.

A pre-submask sequence generator 30 is input with bits 2–5 32 of the Walsh sequence index 8. The pre-submask sequence generator 30 uses this portion of the Walsh sequence index 8 to generate and output a pre-submask sequence 36. The pre-submask sequence 36 corresponds to all of the bits of a row of the submask matrix M indexed by bits 2–5 32 of the Walsh sequence index 8. In this example, the pre-submask sequence 36 consists of 16 bits. The pre-submask sequence generator 30 in the preferred embodiment is implemented by storage of the submask matrix M and the retrieval of bits of rows therefrom using the supplied portion of the Walsh sequence index 32 as the row index into the submask matrix M. Although this may be implemented by using a memory store, the preferred embodiment uses high/low $V_{cc}$ to store the submask matrix M.

An inverse pre-submask sequence generator 40 is also input with bits 2–5 42 of the Walsh sequence index 8. The inverse pre-submask sequence generator 40 uses this index to generate and output an inverse pre-submask sequence 46. The inverse pre-submask sequence 46 corresponds to all of the bits of a row of the bit-wise compliment of the submask matrix M indexed by bits 2–5 42 of the Walsh sequence index 8. In this example the inverse pre-submask sequence 46 is 16 bits in length. The inverse pre-submask sequence generator 40 in the preferred embodiment is implemented by storage of the bit-wise compliment of the submask matrix M and the retrieval of bits of rows therefrom using the supplied portion of the Walsh sequence index 42 as the row index into the bit-wise compliment of the submask matrix M. Although this may be implemented by using a memory store, the preferred embodiment uses high/low $V_{cc}$ to store the bit-wise compliment of the submask matrix M.

The pre-submask sequence 36 and the inverse pre-submask sequence 46 and the supermask bit 16 are provided as input to a submask sequence selector 50. The submask sequence selector 50 operates to generate a submask sequence 56 which is either the pre-submask sequence 36 or the inverse pre-submask sequence 46 based on the supermask bit 16. In the preferred embodiment, the submask sequence 56 is the pre-submask sequence 36 when the supermask bit 16 is 0, and the submask sequence 56 is the inverse pre-submask sequence 46 when the supermask bit 16 is 1. In this example, the submask sequence 56 consists of 16 bits.

A first addressable selector 60 is input with all of the bits of the submask sequence 56 in parallel, and bits 2–5 62 of the Walsh chip position index 4. The first addressable selector 60 uses this index (which in this embodiment serves as the address of the first addressable selector 60) to generate and output a submask bit 66. In the case where the submask sequence 56 is the pre-submask sequence 36, the submask bit 66 corresponds to the bit of the submask matrix M at the column indexed by bits 2–5 62 of the Walsh position index 4, and the row indexed by bits 2–5 32 of the Walsh sequence index 8. In the case where the submask sequence 56 is the inverse pre-submask sequence 46, the submask bit 66 corresponds to the bit-wise compliment of a bit of the submask matrix M at the column indexed by bits 2–5 62 of the Walsh position index 4 and at the row indexed by bits 2–5 42 of the Walsh sequence index 8.

In an alternative preferred embodiment, the pre-submask sequence generator 30 is input with bits 2–5 of the Walsh sequence index 8, and with bits 2–5 of the Walsh chip position index 4. In this alternative preferred embodiment, the pre-submask sequence generator 30 uses these portions of the indices to generate and output a pre-submask bit (not shown in FIG. 1). The pre-submask bit of the alternative preferred embodiment, would correspond to the bit of the submask matrix M at the row indexed by bits 2–5 of the Walsh sequence index 8, and at the column indexed by bits 2–5 of the Walsh chip position index 4. Instead of an inverse pre-submask sequence generator 40, a submask sequence selector 50, and a first addressable selector 60, a single XOR gate (not shown in FIG. 1) may be used to mask the pre-submask bit with the supermask bit 16 to generate the submask bit 66. This alternative preferred embodiment produces the exact same submask bit 66 as that produced by the preferred embodiment with use of bits 2–5 of the Walsh sequence index 8 and bits 2–5 of the Walsh chip position index 4. Although not exhibiting the same parallelism of structure as that shown in FIG. 1, this alternative preferred embodiment is reduced in complexity.

A basic sequence generator 20 is input with bits 0,1 22 of the Walsh sequence index 8. The basic sequence generator 20 uses this portion of the Walsh sequence index 8 to generate and output a basic sequence 26. The basic sequence 26, which in this example consists of four bits, corresponds to the all the bits of a row of the basic sequence matrix $H_4$ at the row indexed by bits 0,1 22 of the Walsh sequence index 8. The basic sequence generator 20 in the preferred embodiment is implemented by storage of the basic sequence matrix $H_4$ and the retrieval of bits therefrom using the supplied portions of the Walsh sequence index 8 as the row index into the basic sequence matrix $H_4$. Although this may be implemented by using a memory store, the preferred embodiment uses high/low $V_{cc}$ to store the basic sequence matrix $H_4$.

A second addressable selector 70 is input with all four of the bits of the basic sequence 26 in parallel, and bits 0,1 72 of the Walsh chip position index 4. The second addressable selector 70 uses this index (which in this embodiment serves as the address of the second addressable selector 70) to generate and output a basic sequence bit 76. The basic sequence bit 76 corresponds to the bit of the basic sequence matrix $H_4$ at the column indexed by bits 0,1 72 of the Walsh position index 4, and the row indexed by bits 0,1 22 of the Walsh sequence index 8.

The generation of the basic sequence bit 76 occurs in two steps, primarily for timing reasons. In the preferred embodiment, generation of the supermask bit 16, occurs in parallel to the generation of the basic sequence 26, and the generation of the submask bit 66 occurs in parallel to the generation of the basic sequence bit 76.

Submask bit 66 is used to mask the basic sequence bit 76 at an XOR gate 80. The output of the XOR gate 80 corresponds to the Walsh bit of the 512×512 Walsh bit sequence matrix, and is passed to a flip flop 90 which outputs a clock synchronized Walsh chip 96 as its output.

The operation of the Walsh chip generator 3 is now discussed in the context of generating the two hundred and sixty first 512-bit Walsh bit sequence or (using the Walsh sequence index) generating $W^{512}_{260}$. It should be noted that although reference is made to the repeating nature of the patterns of the Walsh chips or the various mask sequences or bits, the Walsh chip generator 3 is understood to generate a single Walsh chip based upon an input Walsh sequence index 8 and Walsh chip position index 4. The following illustrates the output for all Walsh chip positions of a single Walsh sequence and should not be misunderstood as implying that the Walsh chip generator 3 must output an entire Walsh sequence. In the preferred embodiment, there is no chip history stored in the Walsh chip generator 3.

The Walsh bit sequence for $W^{512}_{260}$ has a pattern of "00001111" repeated 32 times, followed by a pattern of "11110000" repeated 32 times. The Walsh sequence index 8 of 260 in binary is "100000100". The upper three bits of the Walsh sequence index 8, namely bits 6 through 8 which are "100", is an index corresponding to 4 in decimal. The row of the super mask matrix SM indexed by this index is "00001111" (row 4). Since the column corresponds to bits 6 through 8 of the Walsh chip position index 4, it is clear that the super mask bit 16 will be 0 for all Walsh chips (of this sequence) in positions 0 through 255, and the super mask bit 16 will be 1 for all Walsh chips (of this sequence) in positions 256 through 511. The pre-submask sequence 36 originates from the row of the submask matrix M indexed by bits 2 through 5 of the Walsh sequence index "0001" (or 1 in decimal) which is "0101010101010101". The same row of the bit-wise compliment of the submask matrix M (and which will make up the inverse pre-submask sequence 46) is therefore "1010101010101010". Since the supermask bit 16 is 0 for all chip positions 0 through 255 the submask sequence 56 will be the pre-submask sequence 36 "0101010101010101" repeated four times for those chip positions. Since the supermask bit 16 is 1 for all chip positions 256 through 511 the submask sequence 56 will be the inverse pre-submask sequence "1010101010101010" repeated four times for those chip positions. Turning now to the expected basic sequence 26, the first two bits of the Walsh sequence index is "00". The basic sequence 26 is therefore row 0 of the basic sequence matrix which is "0000", hence the basic sequence bit 76 is 0 for all Walsh chip positions of the Walsh sequence. The index used to index the submask sequence 56 (to generate the submask bit 66) is from bits 2 though 5 of the Walsh chip position index 62, said index which only changes every four consecutive Walsh chip positions. As such, for Walsh chip position indices from 0 to 255, since the submask sequence 56 is "0101010101010101", the submask bit pattern will be "00001111" repeated 32 times. For Walsh chip position indices from 256 to 511, since the submask sequence 56 is "1010101010101010", the submask bit pattern will be "11110000" repeated 32 times. Submask bit 66 is used to mask the basic sequence bit 76 at the XOR gate 80. Since the basic sequence bit 76 is 0 for any Walsh chip position index, the output of the XOR gate 80 will be the same as the submask bit 66. This output from the XOR gate therefore will be "00001111" repeated 32 times for Walsh chip positions 0 through 255 and "11110000" repeated 32 times for Walsh chip positions 256 through 511. This output, which is precisely a desired bit of the Walsh bit sequence $W^{512}_{260}$, will become the desired clocked Walsh chip after it emerges from flip-flop 90.

A preferred embodiment of a Walsh chip generator 3 is implemented completely in hardware, for example on a chip, such as an ASIC (Application Specific Integrated Circuit), FPGA (Field Programmable Gate Array), DSP (Digital Signal Processor), or processor. Assuming the hardware can complete the functionality of FIG. 1 in one clock cycle, an integrated Walsh chip generator will produce one Walsh chip per clock cycle. The Walsh chip generation rate in such an implementation, therefor, will be limited only by the clock speed of the hardware implementation, and the speed with which the hardware implementation is supplied the Walsh chip position and Walsh sequence indices.

Figure 2:
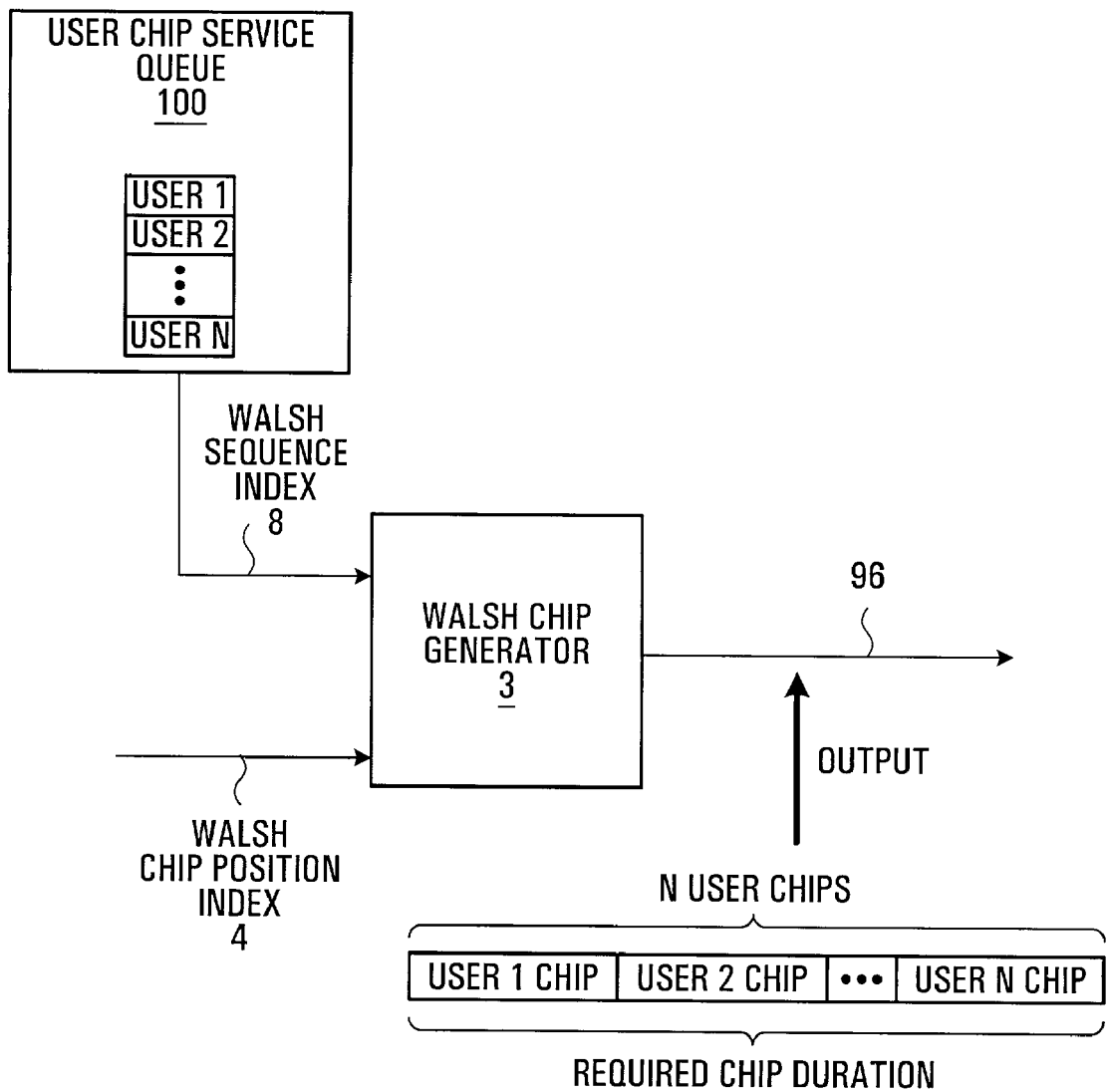
FIG. 2 is a block diagram illustrating the operation of the Walsh chip generator of the preferred embodiment of the invention in the context of a telecommunications system.

Referring now to FIG. 2, the Walsh chip generator 3 in the context of a telecommunications system requiring the generation of Walsh chips at a specific rate is now discussed. A preferred embodiment implemented in hardware has a clock cycle preferably a multiple of, 64 times for example, the Walsh chip requirement rate. In the case where Walsh chips are used for modulation in CDMA channels for example, a power control group is 1.25 ms. Since the Walsh chip sequence index for a particular antenna needs to be synchronized with the two second period for the antenna, or 1600 power control groups, each Walsh chip sequence must start at Walsh chip position 0 at the start of the two second time period, cycle through to chip position 511 and repeat. In a single power control group, the Walsh chip generator completes exactly three cycles of 512 chips, generating 1536 chips. Over the two second time period 1536×1600=2.4576 million chips are generated, and hence the required chip rate is 1.2288 MHz. Modern integrated technology which is used by the preferred embodiment can easily accommodate a clock cycle of 64 times this rate. As such, for the duration of each required Walsh chip, the integrated Walsh chip generator may generate 64 Walsh chips. In the context of multiple users, a user chip service queue 102 maintains a list of users and their assigned user Walsh sequences. Each user requesting a user Walsh chip in the queue is serviced sequentially by providing the Walsh sequence index 8 of the user to the Walsh chip generator 3, for the generation of the requested user Walsh chip. This sequential servicing is user pipelining. In FIG. 2, a list of users labeled USER 1 to USER N (where N is the total number of users) is shown to represent the users serviced thereby. In this example N is 64, 64 being the number of Walsh chips that can be generated per required chip duration. The Walsh chip position index 4 must be the same for each pass through the list of users to ensure proper synchronization of the Walsh sequence modulated signals when transmitted. The output 96 of the Walsh chip generator is represented in FIG. 2 for an entire required chip duration. As can be seen, since the output rate of the Walsh chip generator (corresponding to the clock rate) is N times the required Walsh chip rate, a total of N user chips are generated in the output 96 per required chip duration. In this example, all 64 users therefor have a Walsh chip generated by the integrated Walsh chip generator each required chip cycle. As mentioned above, the Walsh chip generator does not store any history, and is capable of generating any requested Walsh chip at the clock rate regardless of what was previously requested and generated. In the case where the a Walsh chip generator has four pipelines, i.e. four such structures as indicated in FIG. 1, 256 users could be processed per Walsh chip duration. In an exemplary embodiment of an integrated Walsh chip generator, the hardware would be capable of 128 clock cycles per Walsh chip duration, in which 256 users may be serviced with only two pipelines. In the context of using the Walsh sequence generator in a transmitter, typically each antenna would have one Walsh chip generator, translating into, for example for 18 antennas each serving 256 users, a total of 4608 users using one of 512 Walsh codes each.

Figure 3:
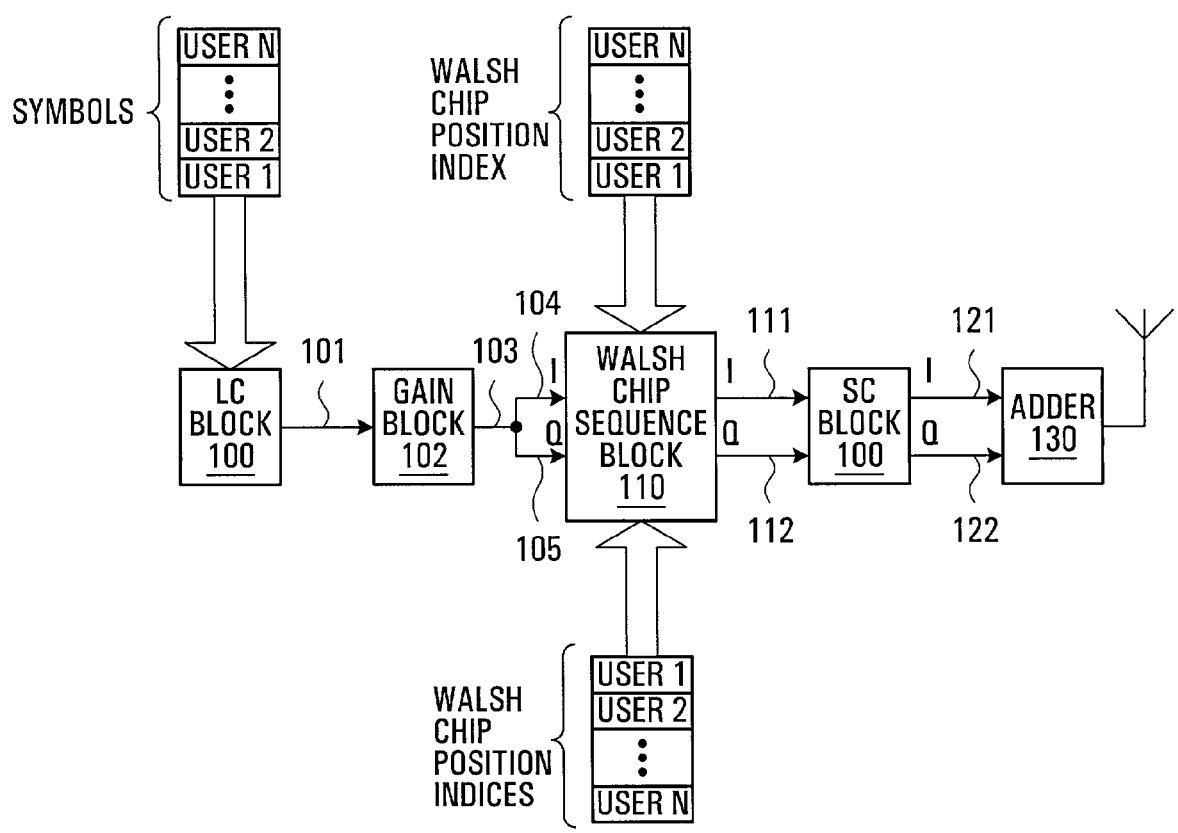
FIG. 3 is a block diagram of a transmitter having a Walsh chip generator constructed according to a preferred embodiment of the invention.

Referring now to FIG. 3, an example transmitter having a Walsh chip generator constructed according to a preferred embodiment of the invention is discussed. This figure further illustrates that the transmitter pipeline is effected through time-sharing of N users, as was discussed in respect of FIG. 2. It should be noted, that in the context of pipelining, each user may be configured independently of the other users up to the constraint that no two users are configured the same, that is no two users are assigned the same Walsh sequence. In this embodiment, symbols of the various users 1 through N are sequentially provided to a long code (LC) block 100 in which a long code is applied to the symbols. The long coded symbols 101 are input to a gain block 102 which splits input signals into in-phase (I) and quadrature (Q) channels and applies a gain. The in-phase channel I 104 and the quadrature channel Q 105 each have a Walsh chip applied to them in the Walsh chip sequence block 110 by a Walsh chip generator therein (not drawn). The Walsh chip sequence block 110 applies the Walsh chip to the I and Q channels (104, 105) with use of the Walsh chip position index and the Walsh chip sequence index sequentially for each user as described above in association with FIGS. 1 and 2. The Walsh coded I 111, and Q 112 channels are provided to a short code (SC) block 120 which applies a short code to the I 111 and Q 112 channels generating a short coded I 121 and a short coded Q 122 channel. The short coded I and Q channels 121, 122 are combined in an adder 130 before being transmitted.

It should be noted that although each stage of the preferred embodiment, the generation of the supermask bit being one stage, the generation of the submask bit being a second stage and the generation of the basic sequence bit being the third stage, corresponds to the generation of a bit being an element of respectively the given example supermask matrix SM, the given example submask matrix M or its bit-wise compliment and the given example basic sequence matrix $H_4$, these three stages may correspond to the generation of bits from any recursively related set of matrices in the sense explained below. For example, a generalized supermask matrix could be an $M_1 \times M_1$ matrix where $M_1$ is equal to some $2^{k1}$. The elements of the generalized supermask matrix would be zeros and ones representing generalized submask matrices (or respectively their bit-wise compliment) each being an $M_2 \times M_2$ matrix where $M_2$ is equal to some $2^{k2}$. The elements of the generalized submask matrices would be ones and zeros representing generalized basic sequence matrices (or respectively their bit-wise compliment) each being a binary $M_3 \times M_3$ matrix where $M_3$ is equal to some $2^{k3}$. In the case where the Walsh bit matrix is 512×512, the only constraint on the sizes of the matrices is that k1+k2+k3=9. The actual entries in the generalized supermask matrix are determined from recursively applying the relation between Hadamard matrix of degree k1 $H_{k1}$ to obtain its expression in terms of the Hadamard matrices of degree k2 $H_{k2}$, a zero representing the presence of a Hadamard matrix of degree k2 $H_{k2}$, and a one representing the presence of the bit-wise compliment of a Hadamard matrix of degree k2 $\overline{H_{k2}}$. The actual entries in the generalized submask matrix (and its bit-wise compliment) are determined from recursively applying the relation between Hadamard matrix of degree k2 $H_{k2}$ to obtain its expression in terms of the Hadamard matrices of degree k3 $H_{k3}$. For the generalized submask matrix, a zero represents the presence of a Hadamard matrix of degree k3 $H_{k3}$, and a one represents the presence of the bit-wise compliment of a Hadamard matrix of degree k3 $\overline{H_{k3}}$, the reverse being true for the bit-wise compliment of the generalized submask matrix. The binary generalized basic sequence matrix is actually the binary Hadamard matrix of degree k3 $H_{k3}$.

In an analogous embodiment where each Walsh sequence is made up of Q chips (instead of 512) the same types of matrices are used in the three stage process, however the constraint becomes k1+k2+k3=$\log_2$ Q. So for Walsh sequences of length 1024, k1+k2+k3=10. In the preferred embodiment for Walsh sequences of length 1024, k1 is 4 (i.e. the supermask matrix is a 16×16 matrix) and the remaining matrices, namely the submask matrix, and its bit-wise compliment and the basic sequence matrix, are the same as that described in association with FIG. 1.

It should be noted that although the preferred embodiment uses a three stage process, a Walsh chip generator constructed according to the invention may have more than three stages. For example a Walsh chip generator having L stages, would have one stage corresponding to some generalized basic sequence matrix, one stage corresponding to the generalized supermask matrix, and P=L−2 stages corresponding to a set of P recursively related submask Hadamard matrices linking the basic sequence matrix right up through to the supermask matrix. In the context of such an embodiment, each submask sequence generator of a series of submask sequence generators, would produce a different submask bit, referred to as a P-level submask bit, from a P-level portions of the Walsh chip position index, a P-level portions of the Walsh sequence index, and the P−1 level submask bit. Clearly in the case of the first of the P-level submask bit generators, there is no P−1 level submask bit, and the supermask bit would be used.

Numerous modifications and variations of the present invention are possible in light of the above teachings. It is therefore to be understood that within the scope of the appended claims, the invention may be practised otherwise than as specifically described herein.

The invention claimed is:

1. An apparatus for generating a chip of a chip sequence, the chip identified by a sequence index and a chip position index, the apparatus comprising:
 a basic sequence bit generator for generating a basic sequence bit using a basic sequence portion of the sequence index and a basic sequence portion of the chip position index;
 a supermask bit generator for generating a supermask bit using a supermask portion of the sequence index and a supermask portion of the chip position index;
 a submask bit generator for generating a submask bit using a submask portion of the sequence index, a submask portion of the chip position index, and the supermask bit; and a masking logic operator for masking the basic sequence bit with the submask bit to generate the chip of the chip sequence.

2. An apparatus according to claim 1 wherein the chip sequence is a Walsh chip sequence.

3. An apparatus according to claim 1 wherein:
the supermask bit generator comprises a supermask matrix storage means for storing supermask bits indexed by the supermask portion of the sequence index and the supermask portion of the chip position index;
the submask bit generator comprises a submask matrix storage means for storing submask bits indexed by the submask portion of the sequence index and the submask portion of the chip position index; and
the basic sequence bit generator comprises a basic sequence matrix storage means for storing basic sequence bits indexed by the basic sequence portion of the sequence index and the basic sequence portion of the chip position index.

4. An apparatus according to claim 3 wherein the supermask matrix storage means, the submask matrix storage means, and the basic sequence matrix storage means each comprise a memory store.

5. An apparatus according to claim 3 wherein:
the chip sequence is a 512 Walsh chip sequence, the sequence index is a 9-bit Walsh sequence index, the chip position index is a 9-bit Walsh chip position index;
the supermask matrix is a binary representation of a $512^{th}$ order Hadamard matrix expressed in terms of $64^{th}$ order Hadamard matrices, the supermask portion of the sequence index being bits 6 through 8 of the 9-bit Walsh sequence index, the supermask portion of the chip position index being bits 6 through 8 of the 9-bit Walsh chip position index;
the submask matrix is a binary representation of a $64^{th}$ order Hadamard matrix expressed in terms of $4^{th}$ order Hadamard matrices, the submask portion of the sequence index being bits 2 through 5 of the 9-bit Walsh sequence index, the submask portion of the chip position index being bits 2 through 5 of the 9-bit Walsh chip position index; and
the basic sequence matrix is a $4^{th}$ order binary Hadamard matrix, the basic sequence portion of the sequence index being bits 0 and 1 of the 9-bit Walsh sequence index, the basic sequence portion of the chip position index being bits 0 and 1 of the 9-bit Walsh chip position index.

6. An apparatus according to claim 1 wherein the submask bit generator comprises:
a pre-submask sequence generator for generating a pre-submask sequence using the submask portion of the sequence index;
an inverse pre-submask sequence generator for generating an inverse pre-submask sequence using the submask portion of the sequence index;
a submask sequence selector for generating a submask sequence wherein the submask sequence is generated from one of the pre-submask sequence and the inverse pre-submask sequence as a function of the supermask bit; and
a submask sequence bit selector for generating the submask bit using the submask sequence, and the submask portion of the chip position index.

7. An apparatus according to claim 6 wherein the basic sequence bit generator comprises:
a basic sequence generator for generating a basic sequence using the basic sequence portion of the sequence index; and
a basic sequence bit selector for generating the basic sequence bit using the basic sequence, and the basic sequence portion of the chip position index.

8. An apparatus according to claim 7 wherein the basic sequence bit selector, and the submask sequence bit selector are addressable selectors.

9. An apparatus according to claim 1 wherein the submask bit generator comprises:
a pre-submask bit generator for generating a pre-submask bit using the submask portion of the sequence index, and the submask portion of the chip position index; and
a pre-submask bit masking logic operator for masking the pre-submask bit with the supermask bit to generate the submask bit.

10. An apparatus for generating a chip of a chip sequence, the chip identified by a sequence index and a chip position index, the apparatus comprising:
a basic sequence bit generator for generating a basic sequence bit using a basic sequence portion of the sequence index and a basic sequence portion of the chip position index;
a supermask bit generator for generating a super mask bit using a supermask portion of the sequence index and a supermask portion of the chip position index;
a series of M ordered m-level mask bit generators for generating a submask bit including a 1-level mask bit generator for generating an 1-level mask bit using a 1-level mask portion of the sequence index, a 1-level portion of the chip position index, and the super mask bit; and M−1 m-level mask bit generators for respectively generating an m-level mask bit using an m-level mask portion of the sequence index, an m-level portion of the chip position index, and an (m−1)-level mask bit; and
a masking logic operator for masking the basic sequence bit with the submask bit to generate the chip of the chip sequence.

11. An apparatus for sequentially generating for each user of a plurality of users a respective user chip of a respective assigned user chip sequence at a required chip rate, each user chip identified by a user sequence index and a chip position index, the apparatus comprising:
a hardware implemented chip generating circuit having a clock rate, for a given chip position index at the required chip rate the transmitter being adapted to input to the chip generating circuit the chip position index and a user sequence index for a different user of the plurality of users during a respective clock cycle, the chip generating circuit comprising:
a) a basic sequence bit generator for generating a basic sequence bit every clock cycle using a basic sequence portion of the user sequence index and a basic sequence portion of the chip position index;
b) a supermask bit generator for generating a supermask bit every clock cycle using a supermask portion of the user sequence index and a supermask portion of the chip position index;
c) a submask bit generator for generating a submask bit every clock cycle using a submask portion of the user sequence index, a submask portion of the chip position index, and the supermask bit; and d) a masking logic operator for masking the basic sequence bit with the submask bit to generate the user chip of the user chip sequence of a different user every clock cycle, wherein the clock rate is at least N times the required chip rate, and user chips are generated for each user of N users at the required chip rate.

12. An apparatus according to claim 11 wherein the transmitter is further adapted to maintain a list of N users, associate each respective assigned user chip sequence with each user, and sequentially provide to the chip generating circuit a user sequence index for a different user of the N users every clock cycle.

13. An apparatus for generating a chip of a chip sequence, the chip identified by a sequence index and a chip position index, the apparatus comprising:

a basic sequence bit generating means for generating a basic sequence bit using a basic sequence portion of the sequence index and a basic sequence portion of the chip position index;

a supermask bit generating means for generating a supermask bit using a supermask portion of the sequence index and a supermask portion of the chip position index;

a submask bit generating means for generating a submask bit using a submask portion of the sequence index, a submask portion of the chip position index, and the supermask bit; and a masking logic operating means for masking the basic sequence bit with the submask bit to generate the chip of the chip sequence.

14. A method for generating a chip of a chip sequence, the chip identified by a sequence index and a chip position index, the method comprising:

generating a basic sequence bit using a basic sequence portion of the sequence index and a basic sequence portion of the chip position index;

generating a supermask bit using a supermask portion of the sequence index and a supermask portion of the chip position index;

generating a submask bit using a submask portion of the sequence index, a submask portion of the chip position index, and the supermask bit; and masking the basic sequence bit with the submask bit to generate the chip of the chip sequence.

15. A method according to claim 14 wherein the chip sequence is a Walsh chip sequence.

16. A method according to claim 14 wherein:

generating the supermask bit comprises retrieving the supermask bit indexed by the supermask portion of the sequence index and the supermask portion of the chip position index, from a supermask matrix storage means;

generating the submask bit comprises retrieving the submask bit indexed by the submask portion of the sequence index and the submask portion of the chip position index, from a submask matrix storage means; and generating the basic sequence bit comprises retrieving the basic sequence bit indexed by the basic sequence portion of the sequence index and the basic sequence portion of the chip position index, from a basic sequence matrix storage means.

17. A method according to claim 16 wherein the supermask matrix storage means, the submask matrix storage means, and the basic sequence matrix storage means each comprise a memory store.

18. A method according to claim 16 wherein:

the chip sequence is a 512 Walsh chip sequence, the sequence index is a 9-bit Walsh sequence index, the chip position index is a 9-bit Walsh chip position index;

the supermask matrix is a binary representation of a $512^{th}$ order Hadamard matrix expressed in terms of $64^{th}$ order Hadamard matrices, the supermask portion of the sequence index being bits 6 through 8 of the 9-bit Walsh sequence index, the supermask portion of the chip position index being bits 6 through 8 of the 9-bit Walsh chip position index;

the submask matrix is a binary representation of a $64^{th}$ order Hadamard matrix expressed in terms of $4^{th}$ order Hadamard matrices, the submask portion of the sequence index being bits 2 through 5 of the 9-bit Walsh sequence index, the submask portion of the chip position index being bits 2 through 5 of the 9-bit Walsh chip position index; and the basic sequence matrix is a $4^{th}$ order binary Hadamard matrix, the basic sequence portion of the sequence index being bits 0 and 1 of the 9-bit Walsh sequence index, the basic sequence portion of the chip position index being bits 0 and 1 of the 9-bit Walsh chip position index.

19. A method according to claim 14 wherein generating the submask bit comprises:

generating a pre-submask sequence using the submask portion of the sequence index;

generating an inverse pre-submask sequence using the submask portion of the sequence index;

generating a submask sequence wherein the submask sequence is generated from one of the pre-submask sequence and the inverse pre-submask sequence as a function of the supermask bit; and generating the submask bit using the submask sequence, and the submask portion of the chip position index.

20. A method according to claim 19 wherein generating the basic sequence bit comprises:

generating a basic sequence using the basic sequence portion of the sequence index; and generating the basic sequence bit using the basic sequence, and the basic sequence portion of the chip position index.

21. A method for generating a chip of a chip sequence, the chip identified by a sequence index and a chip position index, the method comprising:

generating a basic sequence bit using a basic sequence portion of the sequence index and a basic sequence portion of the chip position index;

generating a super mask bit using a supermask portion of the sequence index and a supermask portion of the chip position index;

generating a submask bit from generating a series of M ordered m-level mask bits comprising:

a) generating a 1-level mask bit using a 1-level mask portion of the sequence index, a 1-level portion of the chip position index, and the super mask bit b) generating M−1 m-level mask bits respectively using an m-level mask portion of the sequence index, an m-level portion of the chip position index, and an (m−1)-level mask bit; and masking the basic sequence bit with the submask bit to generate the chip of the chip sequence.

* * * * *